US011002568B2

(12) United States Patent
Lugani et al.

(10) Patent No.: US 11,002,568 B2
(45) Date of Patent: May 11, 2021

(54) INDUCTIVE POSITION SENSOR

(71) Applicant: Melexis Technologies SA, Bevaix (CH)

(72) Inventors: Lorenzo Lugani, Morges (CH); Wolfram Kluge, Dresden (DE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 128 days.

(21) Appl. No.: 16/253,814

(22) Filed: Jan. 22, 2019

(65) Prior Publication Data
US 2019/0226828 A1   Jul. 25, 2019

(30) Foreign Application Priority Data

Jan. 22, 2018  (EP) ................................ 18152820
Jan. 22, 2018  (EP) ................................ 18152822
Jan. 22, 2018  (EP) ................................ 18152825
Jan. 22, 2018  (EP) ................................ 18152828

(51) Int. Cl.
  *G01D 5/20*   (2006.01)
  *G01B 7/00*   (2006.01)
  *G01B 7/31*   (2006.01)

(52) U.S. Cl.
  CPC .......... *G01D 5/2053* (2013.01); *G01B 7/003* (2013.01); *G01B 7/31* (2013.01); *G01D 5/2006* (2013.01)

(58) Field of Classification Search
  CPC .... G01D 5/2053; G01D 5/2006; G01B 7/003; G01B 7/31
  USPC ..... 324/200, 207.15–207.17, 207.23–207.26
  See application file for complete search history.

(56) References Cited

U.S. PATENT DOCUMENTS 4,255,711 A * 3/1981 Thompson ............. G01V 3/107
                                                          324/329
4,893,077 A * 1/1990 Auchterlonie .......... G01B 7/14
                                                          318/656
4,893,078 A * 1/1990 Auchterlonie .......... G01B 7/14
                                                          318/660
(Continued)

FOREIGN PATENT DOCUMENTS

DE    2008013715 U1    1/2009
DE   102016202877 B3 *  6/2017 ........... G01D 5/2053
(Continued)

OTHER PUBLICATIONS

European Search Report from EP Application No. 19152945.2, dated Jun. 7, 2019.
(Continued)

*Primary Examiner* — Jay Patidar
*Assistant Examiner* — Sean Curtis
(74) *Attorney, Agent, or Firm* — Workman Nydegger

(57) ABSTRACT

An inductive position sensor is configured to determine a position of a target device. The inductive position sensor comprises at least two coils for determining said position. At least two of the at least two coils for determining the position at least partially overlap. The at least two coils each have a plurality of portions being equally distributed over N substantially parallel planes, with N being an integer larger than or equal to two. For each of the at least two coils the portions distributed over the N substantially parallel planes are substantially identical, so that mutual inductance between the at least two coils is substantially unaffected by misalignments between the N substantially parallel planes.

15 Claims, 12 Drawing Sheets

(56) References Cited

U.S. PATENT DOCUMENTS

| | | | | |
|---|---|---|---|---|
| 4,996,481 | A * | 2/1991 | Ackerman | G01R 33/341 324/318 |
| 5,003,260 | A * | 3/1991 | Auchterlonie | G01B 7/14 324/207.16 |
| 5,041,791 | A * | 8/1991 | Ackerman | G01R 33/341 324/318 |
| 5,696,444 | A * | 12/1997 | Kipp | F04D 15/0088 324/207.16 |
| 5,804,963 | A * | 9/1998 | Meyer | G01D 5/202 324/207.17 |
| 6,011,389 | A * | 1/2000 | Masreliez | G01D 5/2046 324/207.17 |
| 6,040,697 | A * | 3/2000 | Misic | G01R 33/3415 324/318 |
| 6,107,794 | A * | 8/2000 | Kipp | F04D 15/0088 324/207.16 |
| 6,111,402 | A * | 8/2000 | Fischer | G01D 5/2053 324/207.17 |
| 6,255,810 | B1 * | 7/2001 | Irle | G01B 7/30 324/207.17 |
| 6,259,249 | B1 * | 7/2001 | Miyata | G01B 7/003 324/207.12 |
| 6,304,076 | B1 * | 10/2001 | Madni | G01D 5/2053 318/660 |
| 6,396,273 | B2 * | 5/2002 | Misic | G01R 33/3415 324/318 |
| 6,534,970 | B1 * | 3/2003 | Ely | G01D 5/2073 324/207.17 |
| 6,642,710 | B2 * | 11/2003 | Morrison | G01B 7/003 324/207.12 |
| 6,646,433 | B2 * | 11/2003 | Milvich | G01D 5/2053 324/207.12 |
| 6,714,013 | B2 * | 3/2004 | Misic | G01R 33/3415 324/318 |
| 7,012,430 | B2 * | 3/2006 | Misic | G01R 33/3415 324/318 |
| 7,463,020 | B2 * | 12/2008 | Kuhn | H03K 17/9505 324/207.11 |
| 7,932,715 | B2 * | 4/2011 | Howard | G01D 5/2026 324/207.17 |
| 8,159,213 | B2 * | 4/2012 | Roziere | G01D 5/2291 324/207.17 |
| 8,421,446 | B2 * | 4/2013 | Straubinger | G01D 5/2225 324/207.15 |
| 8,878,523 | B2 * | 11/2014 | Kobayashi | G01D 5/208 324/207.17 |
| 9,945,653 | B2 * | 4/2018 | Howard | G01B 7/003 |
| 10,571,303 | B2 * | 2/2020 | Bilbao De Mendizabal | B62D 15/0215 |
| 2002/0089326 | A1 * | 7/2002 | Morrison | F15B 15/2861 324/207.12 |
| 2003/0067293 | A1 * | 4/2003 | Golder | G01V 3/15 324/67 |
| 2003/0136604 | A1 * | 7/2003 | Yamanaka | G01L 5/221 180/444 |
| 2003/0151402 | A1 * | 8/2003 | Kindler | G01B 7/003 324/207.17 |
| 2003/0160608 | A1 * | 8/2003 | Milvich | G01D 5/2053 324/207.17 |
| 2006/0219436 | A1 * | 10/2006 | Taylor | G01R 15/202 174/529 |
| 2007/0005133 | A1 * | 1/2007 | Lashinski | A61F 2/24 623/2.17 |
| 2008/0204118 | A1 * | 8/2008 | Kuhn | H03K 17/9525 327/517 |
| 2009/0039874 | A1 * | 2/2009 | Kreit | G01D 5/2073 324/207.17 |
| 2009/0140729 | A1 * | 6/2009 | Roziere | G01D 5/2086 324/207.17 |
| 2010/0001718 | A1 * | 1/2010 | Howard | G01B 7/30 324/207.15 |
| 2010/0156402 | A1 * | 6/2010 | Straubinger | G01D 5/202 324/207.25 |
| 2011/0046906 | A1 * | 2/2011 | Albertini | G01R 33/022 702/64 |
| 2011/0181302 | A1 * | 7/2011 | Shao | G01D 5/2225 324/654 |
| 2012/0007591 | A1 * | 1/2012 | Howard | G01B 7/14 324/207.15 |
| 2012/0161759 | A1 * | 6/2012 | Pozzati | G01R 33/093 324/252 |
| 2013/0069637 | A1 * | 3/2013 | Kobayashi | G01D 5/208 324/207.17 |
| 2014/0191750 | A1 * | 7/2014 | Reime | G01V 3/107 324/207.16 |
| 2014/0203800 | A1 * | 7/2014 | Sasaki | G01B 7/30 324/207.16 |
| 2014/0217533 | A1 * | 8/2014 | Pagani | G01R 33/0047 257/427 |
| 2014/0247042 | A1 * | 9/2014 | Lei | G01R 33/093 324/247 |
| 2014/0298785 | A1 * | 10/2014 | Muller | B60T 17/221 60/327 |
| 2014/0327432 | A1 * | 11/2014 | Elliott | G01D 5/2066 324/207.16 |
| 2016/0313142 | A1 * | 10/2016 | Muehlfeld | G01D 5/20 |
| 2017/0175259 | A1 * | 6/2017 | Lee | C23C 16/56 |
| 2018/0313665 | A1 * | 11/2018 | Goto | G01B 7/023 |
| 2019/0154467 | A1 * | 5/2019 | Buck | H05K 1/185 |
| 2019/0226828 | A1 * | 7/2019 | Lugani | G01B 7/31 |
| 2019/0226877 | A1 * | 7/2019 | Kluge | G01D 5/2053 |
| 2019/0331541 | A1 * | 10/2019 | Janisch | G01D 5/2053 |
| 2020/0064158 | A1 * | 2/2020 | Lee | H01F 38/14 |
| 2020/0149927 | A1 * | 5/2020 | Zhang | G01D 5/2086 |

FOREIGN PATENT DOCUMENTS

| | | | |
|---|---|---|---|
| DE | 102016211981 A1 | 1/2018 | |
| EP | 1746430 A1 | 1/2007 | |
| EP | 3514502 A1 * | 7/2019 | G01B 7/31 |
| WO | 2014140298 A2 | 9/2014 | |
| WO | WO-2018108783 A2 * | 6/2018 | G01L 3/105 |

OTHER PUBLICATIONS

European Search Report from EP Application No. 18152822.5, dated Mar. 9, 2018.

European Search Report from EP Application No. 18152828.2, dated Jul. 25, 2018.

European Search Report from EP Application No. 18152820.9, dated Apr. 25, 2018.

European Search Report from EP Application No. 18152825.8, dated Jun. 20, 2018.

* cited by examiner

Top view

Perspective view

Top view

Perspective view

INDUCTIVE POSITION SENSOR

FIELD OF THE INVENTION

The present invention is generally related to the field of position sensors using a magnetic induction.

BACKGROUND OF THE INVENTION

Apparatuses for measuring a magnetic field property of a magnetic field are often referred to as magnetic field sensors or magnetic sensors. These kinds of sensors have a broad field of use. Often, these kinds of sensors are used in combination with magnetized objects or objects which influence a magnetic field in one way or another. Thereby, the magnetic sensors measure at least one property of the magnetic field either emanated by the object, i.e. originating from the object itself, or influenced by the object. Based on the measured at least one magnetic field property the position of the object is determined, thereby more than one measured at least one magnetic field property may be combined or processed to determine the position of the object. Therefore, these sensors are also often called position sensors. The most common position sensors are thereby linear and angular position sensors. A linear position sensor determines the position of the object on a linear path relative to the sensor whereas an angular sensor determines the angular orientation of such an object in the vicinity of the sensor. Furthermore, the sensors are also capable of determining a change in the position of the object, for example a motion of the object on a linear path or its rotation.

The position sensors can either perform direct or indirect measurements of the at least one property of the encountered magnetic field to determine the linear and/or angular position of the object. The measured property of the magnetic field allows quantifying the magnetic field, for example in terms of the magnetic field strength, its direction or the magnetic flux etc. and as such allows a determination of the position of the object, which either emanates the magnetic field or affects the magnetic field. For a direct measurement, for example, the magnetic field strength of the magnetic field encountered can be measured, whereas for an indirect measurement the magnetic flux can be measured by measuring a quantifiable property induced by the magnetic flux, for example an induced current or voltage.

Position sensors using direct measurements often times employ Hall elements, in order to measure the magnetic field strength of the encountered magnetic field and then determine the angular and/or linear position of the object based on the measured magnetic field strength.

Position sensors using indirect measurements often times employ inductive sensor elements, for example coils, in order to measure a property induced by the encountered magnetic field and then determine based on the measured induced property the angular and/or linear position of the object, which in this context is also often referred to as target. Inductive sensors rely on the physical effect of electromagnetic induction, wherein an electric field is generated in a coil by changes in a magnetic flux density. This arrangement enables the formation of a no-contact sensor, whereby a maintenance-free sensor can be produced. The magnetic field which induces the measured property can thereby either originate from the target, for example by eddy currents induced in the target itself, or can originate from a coil generating a magnetic field, which then couples via the target to at least one receiving coil.

Inductive position sensors have a long track record for reliable operation in difficult conditions. Consequently, they are often chosen for safety related, safety critical or high reliability applications, like e.g. in the automotive sector. Inductive magnetic sensors are not affected by static disturbing magnetic fields (static stray fields) from surrounding components, devices, apparatuses, or the environment in general. Nevertheless, these inductive magnetic sensors are still sensitive to alternating disturbing magnetic fields (alternating stray fields).

In recent years there is a growing trend towards miniaturisation of inductive sensors. This implies that if performance has to remain unchanged, the alignment tolerances between the coils constituting the sensor should scale as well. In particular, inductive sensors based on separate coils for transmission and reception of the inductive signals are very sensitive to coil alignment, as the relative position between transmit and receive coils greatly affects the direct coupling between them. This unwanted signal can be very strong if not managed correctly. This direct coupling is nothing else but the mutual inductance between the transmit and receive coils in the absence of a target device.

The manufacturing tolerances cannot always be reduced when the coils are made smaller. For example, for PCB (printed circuit board) based sensors there are clearly limits to the reduction of these tolerances. This means that the direct coupling between transmit and receive coils can become uncontrolled and introduce offsets much stronger than the signal amplitude.

Prior art rotary inductive sensors are often based on large coils. Given the relatively big dimensions of such sensors, misalignment between coils due for example to misalignment between the planes of the printed circuit board (PCB) containing the coils, is then no issue. However, use of such large coils cannot be maintained given the current trend towards miniaturisation. In that case a misalignment of for example 100 µm would have an impact which cannot be neglected anymore.

In U.S. Pat. No. 6,255,810 an inductive angle sensor is disclosed having two LC oscillators of an approximately identical design. By inductively coupling the oscillators, the oscillators synchronize themselves with respect to frequency and phase relationship so that undesirable mutual interference is prevented.

There is a need for inductive position sensors with a design suitable for miniaturization.

SUMMARY OF THE INVENTION

It is an object of embodiments of the present invention to provide for an inductive position sensor wherein coils are applied which are designed to have a substantially reduced sensitivity to manufacturing tolerances.

The above objective is accomplished by the solution according to the present invention.

In a first aspect the invention relates to an inductive position sensor configured to determine a position of a target device, comprising at least two coils for determining said position, whereby at least two of said at least two coils for determining said position at least partially overlap, whereby said at least two coils each have a plurality of portions being substantially equally distributed over N substantially parallel planes, N being an integer larger than or equal to two, and whereby for each of said at least two coils said portions distributed over said N substantially parallel planes are substantially identical, so that mutual inductance between said at least two coils is substantially unaffected by misalignments between said N substantially parallel planes. The coils may actually be any inductive element, for example a wire, a wire in the shape of a coil, a wire in the shape of a spiral, or a wire in the shape of a helix, a loop, a multi turn loop, a solenoid, an inductor, or an array.

The proposed solution indeed allows for keeping the mutual inductance variation unaffected or almost unaffected. This is due to the design wherein the coils at least partial overlap, the coils having substantially identical portions equally distributed over two or more parallel planes. Thanks to the specific arrangement proposed in this invention an increase in mutual inductance in one part of the inductive sensor is always compensated by a corresponding decrease in another part. Otherwise stated, the mutual inductance change, when the planes are translated one to another, between the portion of the first coil in the first plane and the portion of the second coil in the second plane should be substantially opposite to the mutual inductance change between the portion of the first coil in the second plane and the portion of the second coil in the first plane. Substantially opposite should be interpreted as that at least to a first order both mutual inductances have the same but opposite change.

In some embodiments of the present invention, the coils are considered to be substantially identical when the geometry of a coil can be obtained by plane symmetry and/or translations and/or rotations. It is important to mention that due to the presence of feeding vias and readout signals, some asymmetries are required for practical reasons, thereby introducing some asymmetry. Such vias and feeding lines should not be considered and therefore substantially identical coils might have discrepancies, in particular in their extremities. In alternative embodiments of the invention, the coils wire thickness and width may vary between identical coils up to 10% or up to 50% or up to 100% locally or in their full, although in some other embodiments the coils wires may have identical width and thickness.

In some embodiments of the present invention, the coils are stated to be substantially equally distributed in a given number of planes if the length of the wires constituting the coils are of substantially the same length, or the length of the wires in the planes are in a range of +/−20% of the average length of the coils in each plane, or the length of the wires in the planes are in a range of +/−10% of the average length of the coils. It is important to mention that due to the presence of feeding vias and readout signals, some discrepancies between planes are required for practical reasons, so introducing some asymmetry in the lengths between planes. Such vias and feeding lines should not be considered when computing the length of a coil within a plane and therefore substantially equally distributed coils might have discrepancies, in particular in their extremities and/or top and bottom planes.

In a preferred embodiment one of the overlapping coils at least partially overlaps with all other coils of said at least two overlapping coils. Any pair of said other coils then preferably does not have any overlap.

In an advantageous embodiment vias connecting for each coil the various portions of the plurality of portions distributed on said N substantially parallel planes are substantially in a set of M symmetry planes of the configuration formed by the at least two coils, whereby the M symmetry planes are orthogonal to the parallel planes.

In a preferred embodiment the number N of substantially equal planes equals two.

Preferably the portions of the at least two coils are substantially identical in size and/or in shape.

In embodiments of the invention the at least two coils are arranged to be connected to a feeding wire.

Advantageously, at least one coil is a transmitter coil and at least one coil is a receiver coil.

In a preferred embodiment the inductive position sensor comprises two substantially parallel planes and one coil arranged to act as transmitter coil and with three portions in each plane and three coils arranged to act as receiver coil each with one portion in each plane.

In a specific embodiment the inductive position sensor comprises six coils arranged to act as receiver coil and each comprising one portion in each plane.

In one embodiment each of the N substantially parallel planes is comprised in a printed circuit board or in a redistribution layer or in a leadframe.

In embodiments of the invention the inductive position sensor as previously described, is comprised in a package wherein the at least two coils are smaller than 10 mm×10 mm.

In another aspect the invention relates to a system comprising an inductive position sensor as previously described and a target device arranged to rotate around a centre of geometry of the inductive position sensor.

In another aspect the invention relates to a method for an inductive position sensor configured to determine a position of a target device and comprising at least two at least partially overlapping coils each having a plurality of portions. The method comprises distributing substantially equally over at least two substantially parallel planes the at least two coils each having said plurality of portions, whereby for each of the at least two coils the portions distributed over the at least two substantially parallel planes are substantially identical and whereby the at least two coils are inside a package comprising the inductive position sensor. Preferably the package with the inductive position sensor also comprises a determination unit. Further the package may comprise a lead frame and passive capacitors for electromagnetic compatibility.

The method may also comprise a step of moulding the at least two at least partially overlapping coils and the determination unit in a single mould compound. Said mould compound may comprise a lead-frame partially extending outside said mould compound and may also comprise some integrated capacitor inside said mould compound.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
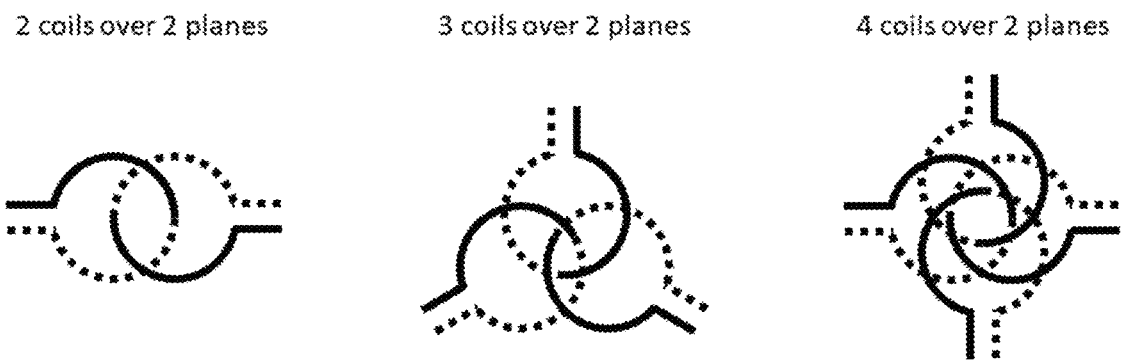
FIG. 1 illustrates a possible distribution of a number of coils over two parallel planes.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

A sensor chip according to an embodiment of the invention can be referred to as a sensor, a position sensor, an inductive sensor or an inductive position sensor. The sensor chip comprises an arrangement of sensor elements. An inductive position sensor according to the present invention comprises a set of inductive elements with a specific design that makes the set distributed over at least two parallel planes largely insensitive to displacements between the different planes constituting the ensemble. In particular, the mutual inductance between coils is made largely insensitive to misalignment between the planes. An inductive element may, for example, be a coil, a wire, a wire in the shape of a coil, a wire in the shape of a spiral, or a wire in the shape of a helix, a loop, a multi turn loop, a solenoid, an inductor, or an array.

At least two of the coils of the position sensor overlap each other for at least a part. In certain embodiments there can be a full overlap between two or more coils. Each coil comprises a number of portions spread over at least two planes. A basic idea behind the proposed design is to have equivalent portions of each coil distributed equally on the planes which need to be properly aligned in order to achieve good sensor performance. Equivalent portions distributed on the different planes are substantially identical and contribute in a substantially identical way to the self-inductance and mutual inductance of the coil.

Each sensor element possesses contacts via which signals or information in general may be propagated from the sensor elements to an optional determination unit. Furthermore, the contacts may be used to provide the sensor elements with an alternating current to generate a magnetic field or to drive the sensor elements in general. The determination unit can be part of the sensor chip in certain embodiments, but may be external to the actual sensor chip in other embodiments or can be absent all together.

The sensor chip may also comprise further contacts, with which the sensor chip can be connected to circuit boards and with which signals can be inputted and outputted from and to the sensor chip. Thereby, the contacts can either be connected to the determination unit, or if the determination unit is absent, these further contacts can be connected to the above-mentioned contacts for information propagation.

In certain embodiments the determination unit is part of the package comprising the inductive position sensor. The at least two coils of the position sensor preferably are dimensioned less than 10 mm×10 mm or 8 mm×8 mm when the coils are inside the package. In some embodiments said package comprising the determination unit and the at least two coils is a single moulded package. The package may also comprise a lead frame, electrically connected to the determination unit and having leads at least partially extending outside of said moulded package.

At least one sensing element is generating a magnetic field, as such that sensor element can also be named transmitting sensor element. At least one sensor element receives the magnetic field, as such that sensor element can also be named receiving sensor element. The sensor elements may however change their operational mode from transmitting to receiving, such that the here shown embodiment examples may only refer to an operational mode configuration of the illustrated sensor elements at one given point in time. Thereby, the sensor elements may be configured to independently change their operational mode from receiving to transmitting and vice versa. Although the sensor elements may be configured to change their operational modes, it may also be possible that at least one of the sensor elements keeps its operational mode while the respective other sensor elements change their operational modes. Furthermore, it is contemplated that the different sensor elements may change their sensitivity and/or the strength of the magnetic field they produce.

The sensor elements are electrically conductive coils. This means if a current passes through the transmitting sensor element the first magnetic field is generated. The thus generated first magnetic field couples via the target to the receive coils, into which a current is induced due to the coupling, respectively due to the magnetic flux associated with the magnetic field. These induced currents can be outputted by the coils as their measured signal and can form a signal. This signal gives an indication of how the target has affected the magnetic field generated by the transmitting coil and in turn how the preferred direction of the target is orientated in comparison to the RX sensor elements. Since the utilized target as well as the position of the coils with respect to each other is known, the position of the target can directly be calculated from the induced properties. However, it is also possible that during a calibration run the respective induced properties have been correlated with the position of the target, then this information can be used to determine the position of the target from the signal. Thereby, the respective induced properties for the calibration run may be stored in a lookup table and may be compared to the measured current values, respectively the signal, to determine the position of the target. It is however also possible that instead of, or additionally to, a calibration run, modelled results are stored, which can be compared to the measured induced properties and the signal, respectively. The induced properties may be the induced currents induced voltages in the receiving coils.

Figure 2:
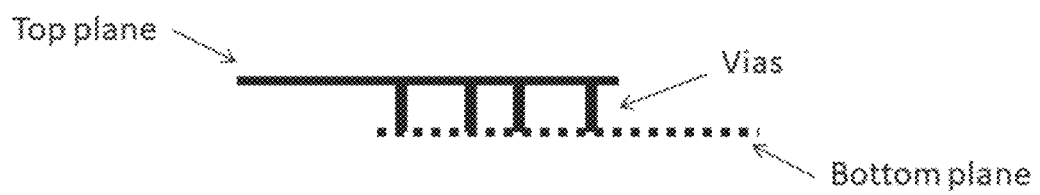
FIG. 2 illustrates the interconnection between two planes in an embodiment of an inductive position sensor with four coils.

FIG. 1 shows by way of example some possible configurations of a number of overlapping coils (2, 3 or 4, respectively) over N=2 substantially parallel planes. Coil parts on a first plane are in solid lines and coil parts on a second plane are in dashed lines. Each coil thus has two portions in the embodiments shown in FIG. 1, one on each plane. FIG. 1 also illustrates that the two portions of the coils on the two different planes are substantially identical. The portions are in other words equally distributed over the two parallel planes. FIG. 2 offers a side view of the two planes and illustrates for the case of four overlapping coils of FIG. 1 the vias between the top plane and the bottom plane to establish the connection.

In certain embodiments the vias connecting the coil portions on the top plane and the bottom plane (or between the N substantially parallel planes in a more general case) are substantially in a set of M symmetry planes of the configuration that the at least two coils form, whereby the symmetry planes are orthogonal to the parallel planes. In other embodiments at least one via connecting receiving coil portions on the top plane and the bottom plane per coil (or between the N substantially parallel planes in a more general case) is substantially in at least one of a set of M symmetry planes of the configuration formed by the at least two coils, whereby the symmetry planes are orthogonal to the parallel planes. In some other embodiments at least two vias connecting receiving coil portions on the top plane and the bottom plane per coil (or between the N substantially parallel planes in a more general case) are substantially in a set of M symmetry planes of the configuration formed by the at least two coils, whereby the symmetry planes are orthogonal to the parallel planes. In yet other embodiments the vias connecting the coil portions on the top plane and the bottom plane (or between the N substantially parallel planes in a more general case) are substantially in a set of cylindrical planes coaxial with the at least two coils and with a central axis orthogonal to a plane defined by said coils. In some embodiments the set of cylindrical planes may comprise at least one cylindrical plane or at least two cylindrical planes or at least 3 cylindrical planes, or at least 3 cylindrical planes. It is clear that for implementing the coils in some substrates such as PCB, additional vias are required in order to allow feeding lines to reach the coils as well as to redistribute other signals. Such additional vias should not be considered as part of the coil structure and therefore should not be considered for assessing the symmetry of the coils.

In certain embodiments of the invention each of the coils sections of at least one coil is in a different plane. In some other embodiments at least two coil sections of at least one coil are in a same plane.

In some other embodiments each plane comprises at least two coil sections of at least one coil of the set of coils. In some other embodiments of the invention each plane comprises at least two coils sections of at least one receiving coils. In some other embodiments of the present invention each of the receiving coils have the same number of section on each plane (L), and the transmitting coil may have the same number of sections on each plane (K) or a different number of sections on each plane. In some embodiments the receiving coils and the transmitting coils may have the same number of sections per plane (K=L).

At least one of the coils of the position sensor serves as a transmitter coil and at least one other coil adopts the role of receiver coil. In preferred embodiments the coils can be connected to a feeding wire.

Figure 3:
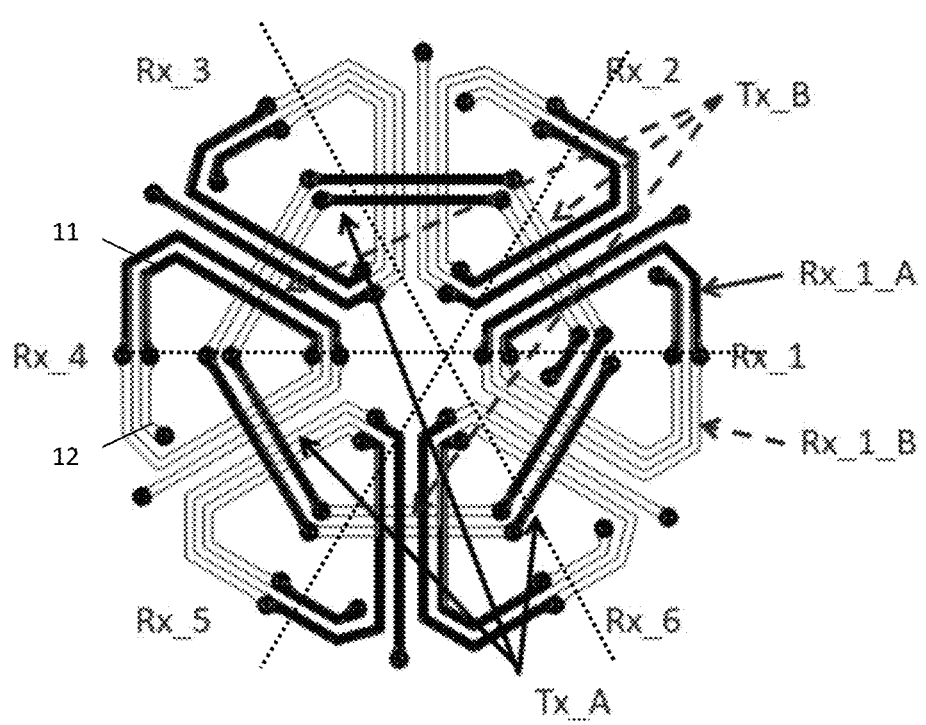
FIG. 3 illustrates an embodiment of an inductive position sensor with one transmit coil and six receive coils.

FIG. 3 illustrates another implementation of the coils of the inductive position sensor. There is one transmit coil and six receive coils. The transmit coil of FIG. 3 is split in six portions, of which three stand on one plane and three other portions on the second plane, in an alternating fashion. The six receive coils are each split in two portions, one (11) of which is on the first plane and the other one (12) on the second plane. The set of transmit coil portions on the first plane is denoted Tx_A and indicated in thick lines in FIG. 3. The set of the transmit coil portions on the second plane is Tx_B and indicated in thin lines in the figure. Similarly, for each receive coil the set of receive coil portions on the first plane and on the second plane can be indicated. For example, the first receive coil Rx_1 is split in a Rx_1_A and a Rx_1_B portion. Also for the receive coils the portion on the first plane are in thick lines and those on the second plane in thin lines. In FIG. 3 the above-mentioned symmetry planes (three in this particular example) wherein most of the vias are located, are indicated in dotdashed lines. The symmetry planes are orthogonal to the parallel planes.

Figure 4:
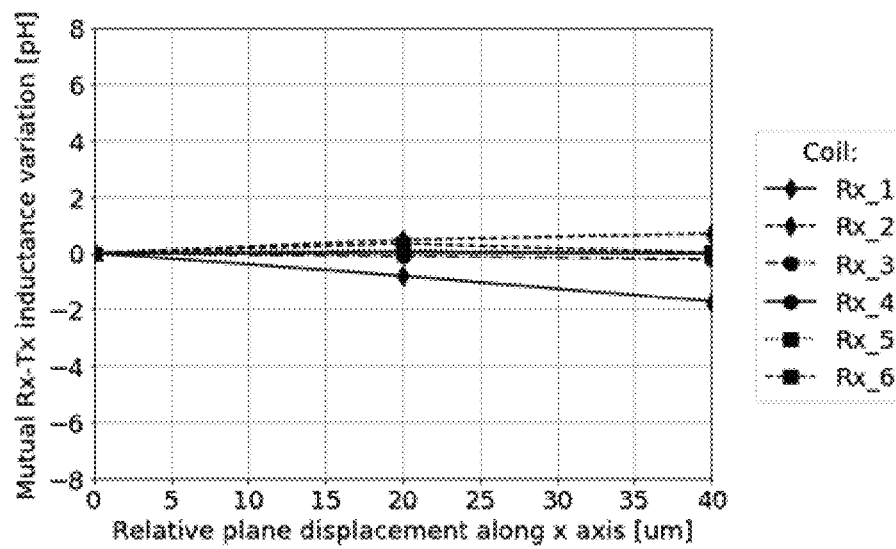
FIG. 4 illustrates the mutual inductance variation for the embodiment of FIG. 4.
Figure 5:
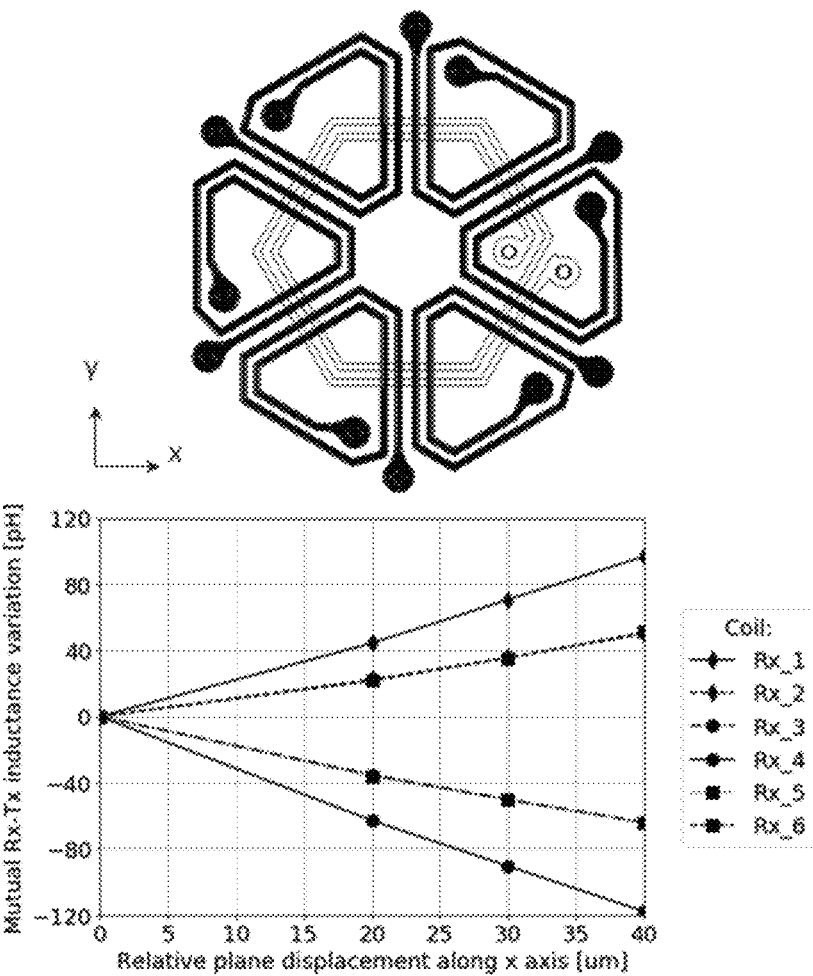
FIG. 5 illustrates for comparison purposes a set-up with one transmit coil and six receive coils wherein the specific design of the invention is not adopted and the corresponding mutual inductance variation observed in that case.

The mutual inductance between the transmit coil and receive coil Rx_1 is then the sum of four terms, which are the Tx_A-Rx_1_A mutual inductance, Tx_A-Rx_1_B mutual inductance, Tx_B-Rx_1_A mutual inductance and Tx_B-Rx_1_B mutual inductance, respectively. It is now considered how these four terms evolve as one moves away from perfect alignment between the two planes. It is clear that the Tx_A-Rx_1_A and Tx_B-Rx_1_B mutual inductances do not change, as the coil portions are on the same plane. The terms that change with relative plane displacements are the mutual inductance between Tx_A and Rx_1_B and the mutual inductance between Tx_B and Rx_1_A. An interesting fact is that these two terms change in opposite ways. If the Tx_A-Rx_1_B mutual inductance increases, the Tx_B-Rx_1_A mutual inductance drops by the same amount. Thanks to this compensating mechanism, the total mutual inductance between Tx and Rx_1 coils remains unchanged, at least in case the displacements are not too strong. As will be illustrated later, for larger displacements the two varying terms do not compensate anymore exactly. However, with respect to the case where the transmit coil is in just one of the planes and the receive coils in the other plane, the mutual inductance sensitivity to displacements between planes is greatly suppressed. A similar reasoning applies for all other receive coils. The effect is illustrated in FIG. 4, showing of the mutual Rx-Tx inductance variation as a function of the relative plane displacement along the x-axis. For not too strong displacements there is indeed virtually no variation in mutual inductance. For somewhat bigger displacements there is only a limited amount of mutual inductance. When comparing with a case (see FIG. 5) where no special design as proposed in this invention is applied, the beneficial effect of the proposed solution can clearly be observed.

Figure 6A:
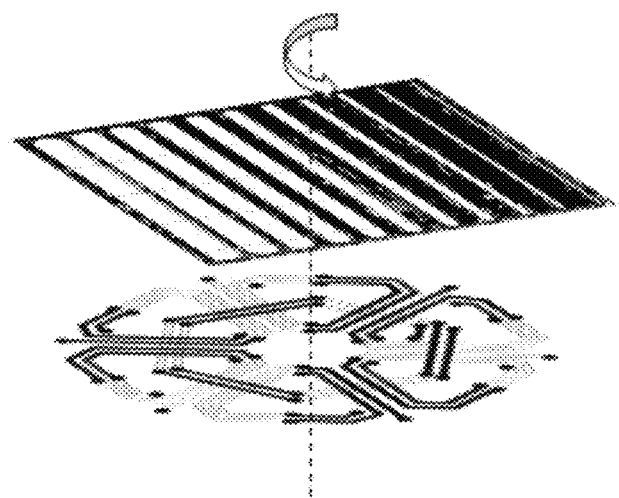
FIG. 6A and FIG. 6B illustrate an inductive rotary sensor comprising a target and the position sensor of FIG. 3 and FIG. 5, respectively.
Figure 6B:
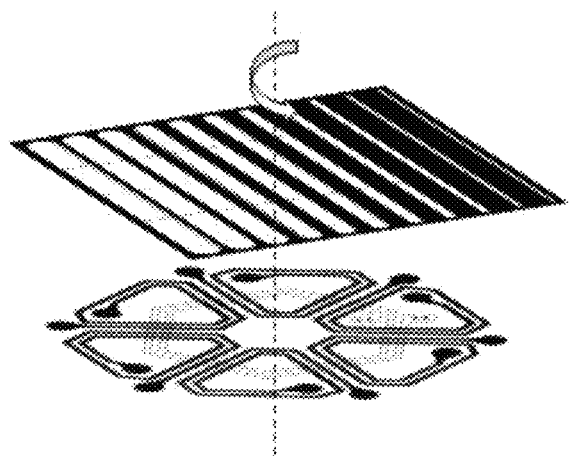
Figure 7A:
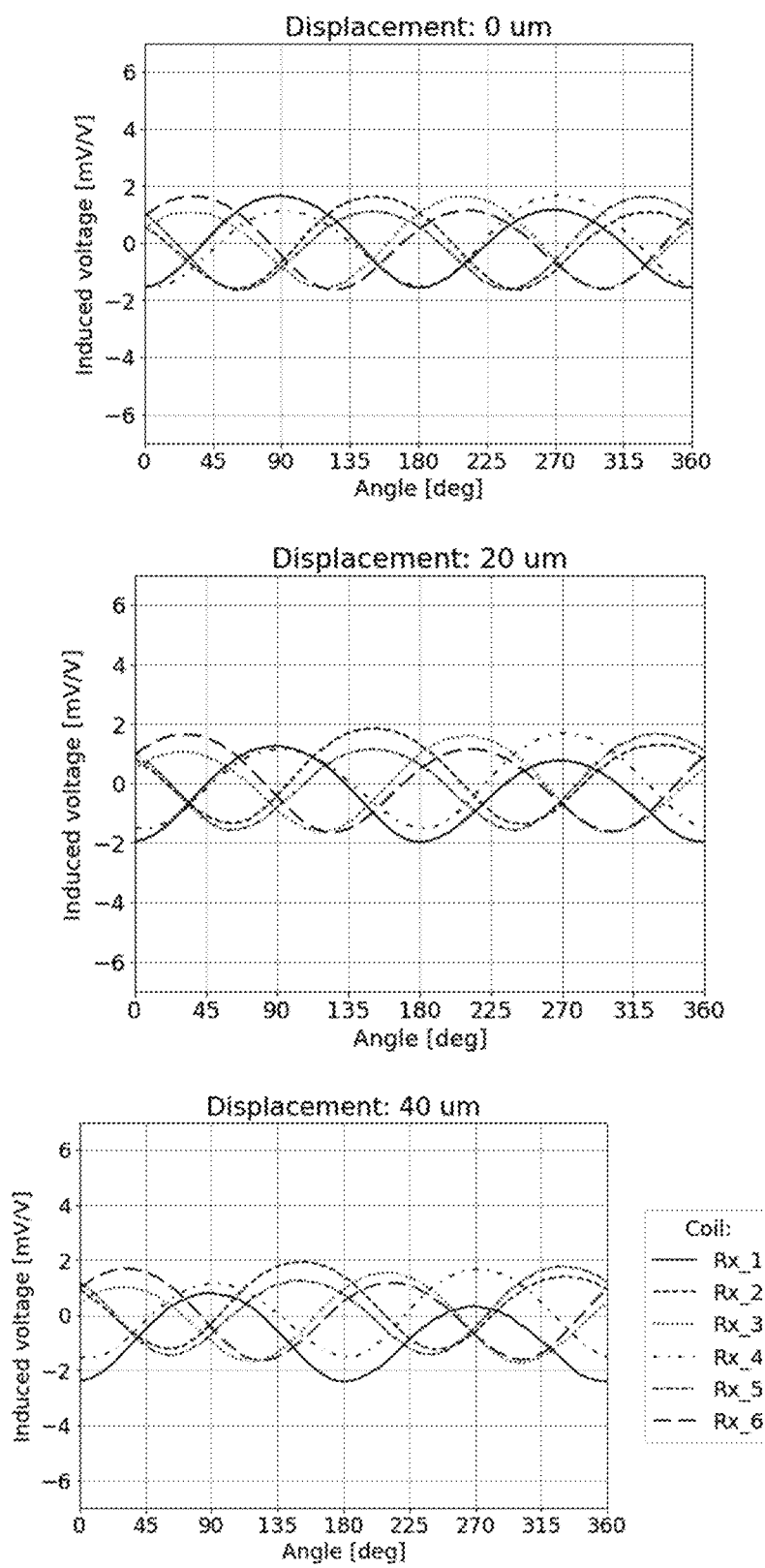
FIGS. 7A and 7B illustrate the operation of the designs of FIG. 6A and FIG. 6B, respectively.
Figure 7B:
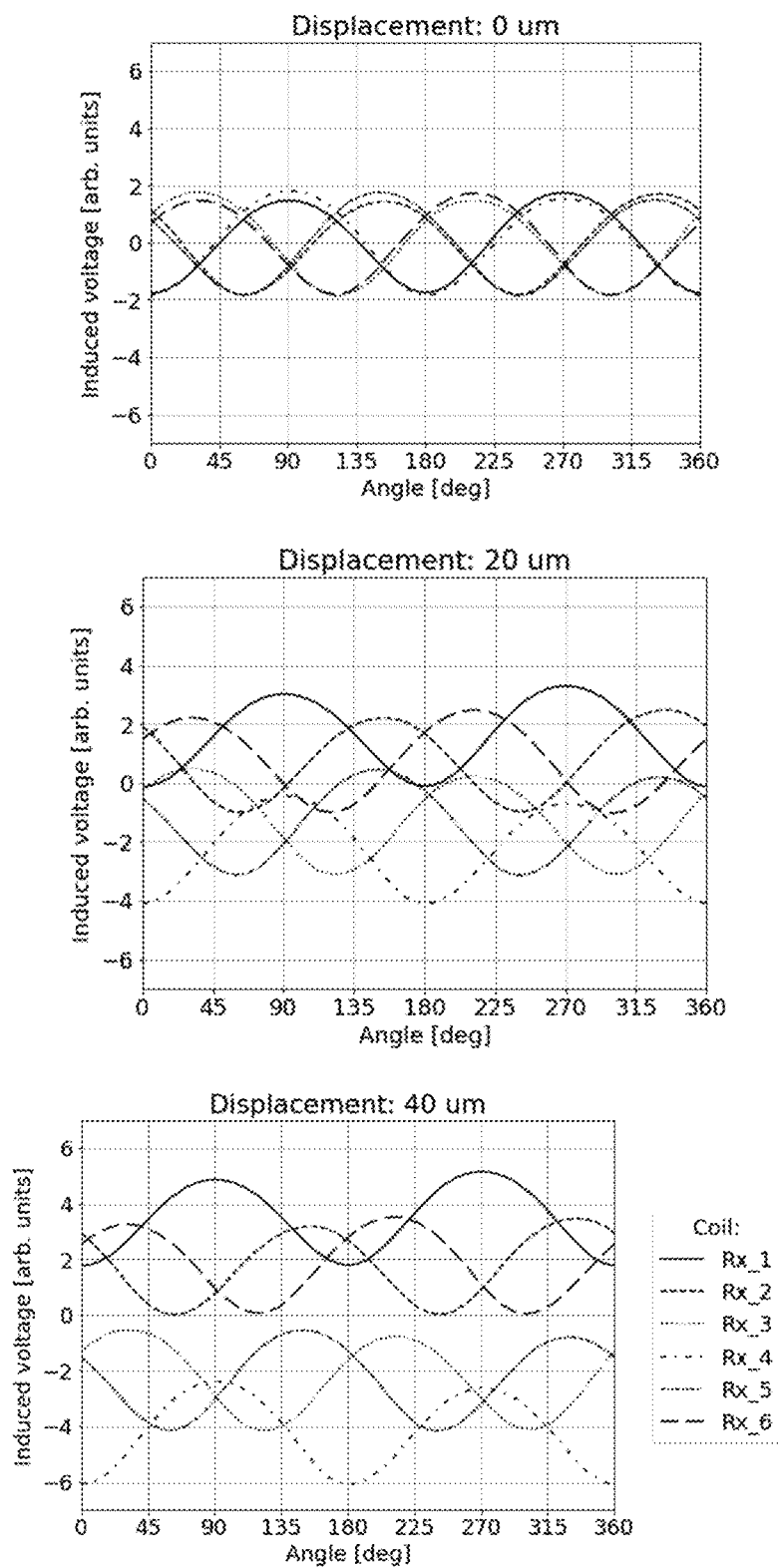

When a coil set as in FIG. 3 is used as an inductive rotary sensor, a target is added to the system, introducing an angle dependent signal captured by the receive coils. This leads to the structure shown in FIG. 6A. The angular average of the signal produced by the receive coil would be 0 if the mutual inductance between transmit and receive coil were 0. However, this is in general not the case. In addition to that, if the transmit coil is placed entirely on one plane and the receive coils entirely on a second plane as in FIG. 6B (corresponding to the set-up shown in FIG. 5), displacements between the planes can change significantly the mutual inductance between transmit and receive coils. This translates in uncontrolled offsets, as shown in FIGS. 7A and 7B for some representative displacements. The graphs of FIG. 7A represent the evolution of the induced voltage over a range of 360° for a displacement of 20 and 40 μm compared to a reference case. When the coils are split over the two planes according to the invention, one can on the other hand see from FIG. 7B that the relative offsets between the various signals are much more stable against the coil plane displacements.

In a preferred embodiment each of the N substantially parallel planes is comprised in a printed circuit board or in a redistribution layer or in a leadframe. Other technologies can be applied as well, as the skilled person will readily appreciate.

Figure 8:
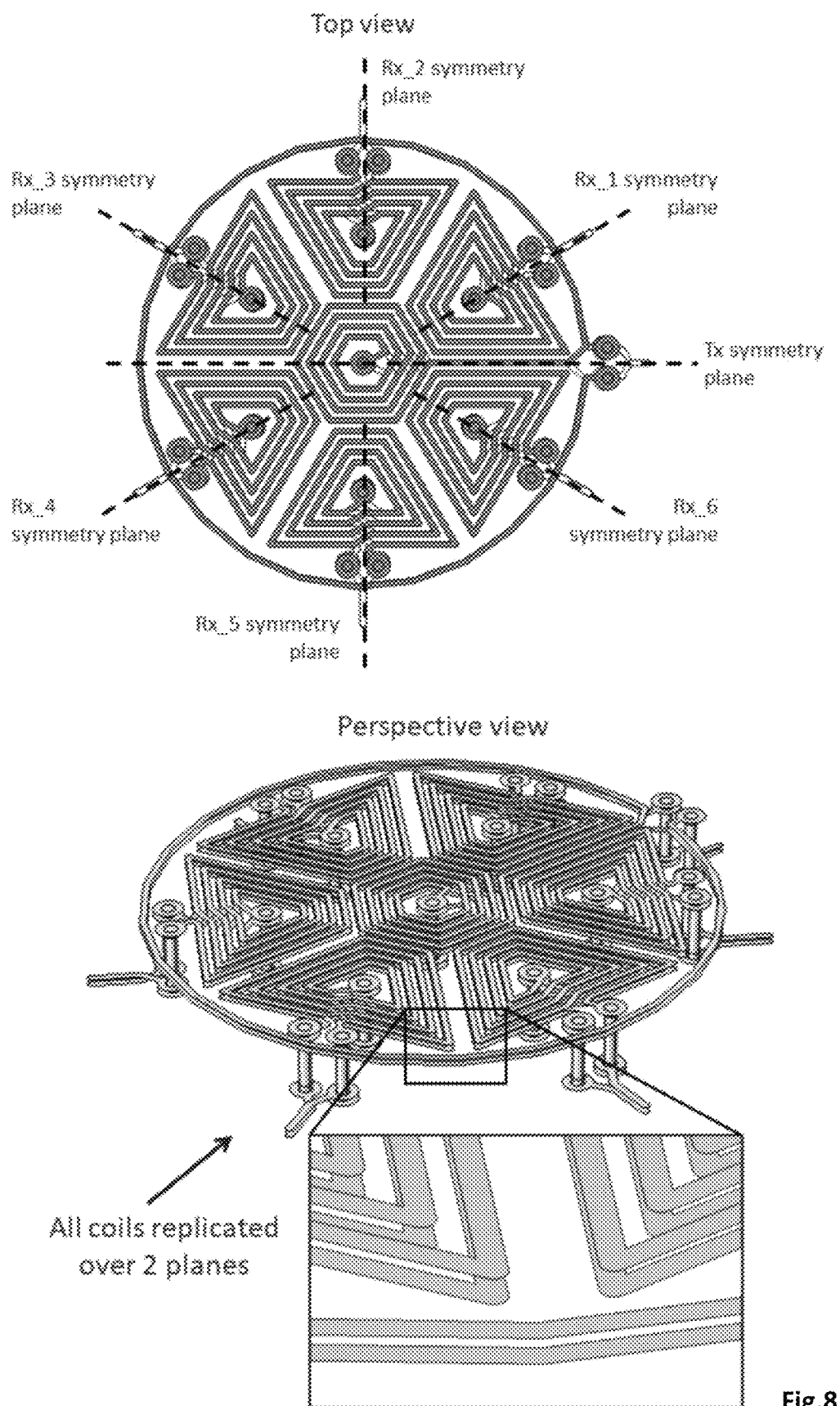
FIG. 8 illustrates an embodiment of an inductive position sensor according to the invention.

In FIG. 8 an embodiment is shown wherein the coil set is composed of one large Tx coil and six Rx coils. A top view and a perspective view are given. Each of the coils comprises two windings distributed over the two planes, the first winding lying in a top plane and the second winding lying in the bottom plane. The two windings are related by a symmetry operation around a plane orthogonal to the coil planes, which are also sketched in the figure. In this way, the two windings constituting a given coil spiral in the same sense and symmetry is maintained between the two coil portions. This applies to all coils of the coil set. A perspective view of the design is shown as well, together with a zoom of a portion showing more clearly that the coils are actually constituted of two windings. In fact, the two windings of a given coil are almost identical in this particular design, and in the top view of the figure on the left the top winding almost hides entirely the bottom winding.

Each coil needs feeding wires for the connection to external circuitry. Such wires cannot always be made in the two planes discussed above. Therefore, the coils need to be extended over additional planes for feeding wire manufacturing, which is well visible in the perspective view of FIG. 8. As already mentioned previously, such small portions of the coil break the symmetry of the system.

Figure 9A:
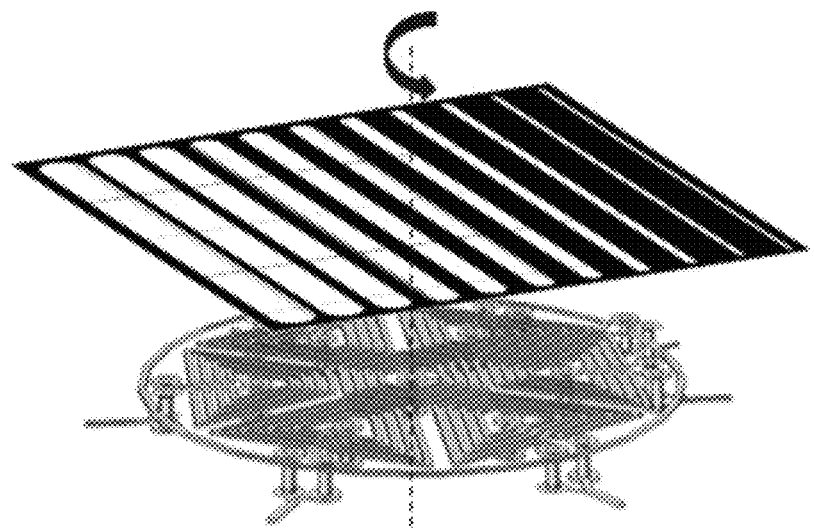
FIGS. 9A to 9C illustrate the operation of the embodiment shown in FIG. 8.
Figure 9B:
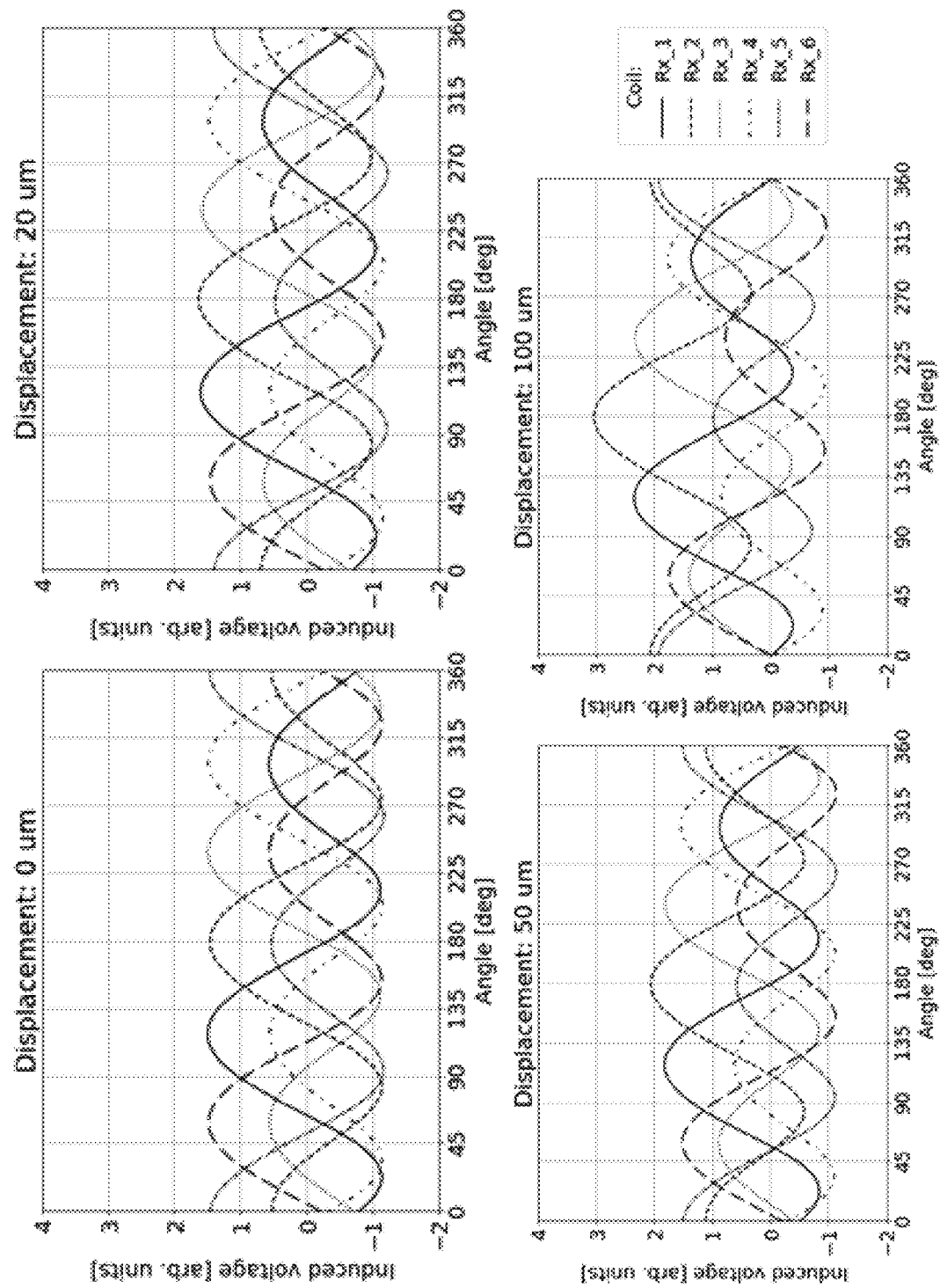
Figure 9C:
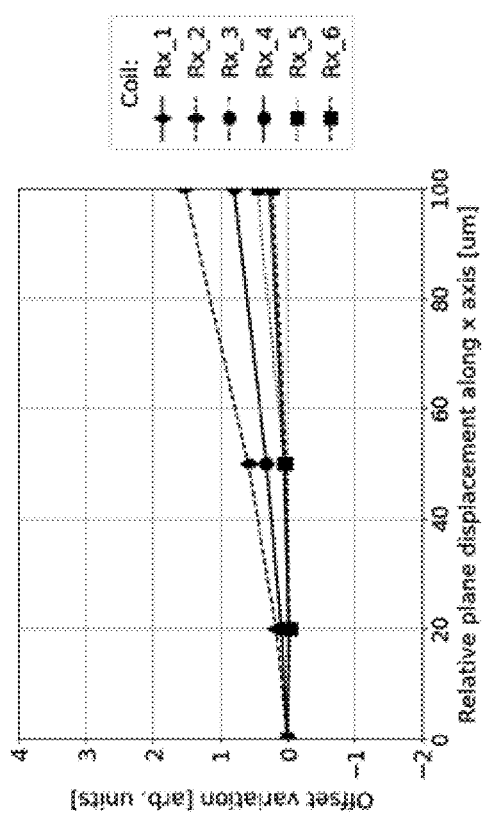
Figure 9C:
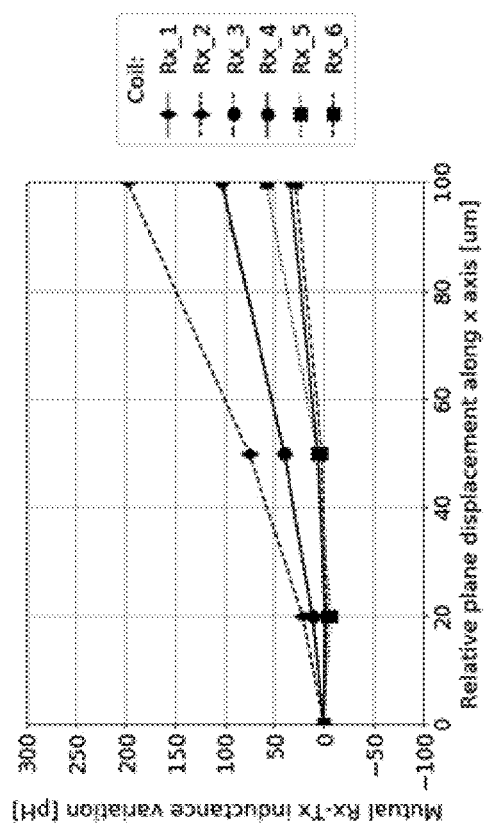

The operation of an inductive position sensor embodied as in FIG. 8 is illustrated in FIGS. 9A to 9C. To have the coil set operating as an angular sensor, the Tx coil is excited by an AC voltage source in order to produce a first magnetic field. An anisotropic target, whose rotation has to be monitored, is placed on top of the coil set (see FIG. 9A). Currents are generated within the target by the first magnetic field due to magnetic induction. Such induced currents produce in turn a second field which is captured by the Rx coils, thus generating six Rx signals of which the intensity depends on the angle of rotation of the target. Such signals are shown in FIG. 9B. In addition to the nearly sinusoidal signals generated by the target, the signals present an average value which is generally not zero, also referred to as the common mode. This common mode is due to the direct coupling between the Tx and the Rx coil. In an ideal situation the common mode signal is 0 or equal for all six Rx coils. In other words, the mutual inductance between the Tx and the Rx coil should vanish or be identical for all the six Rx coils. When the coil planes are perfectly aligned, this is true. However, when a misalignment between the planes is introduced, the mutual inductance may take non-zero values and become significantly different for the six different Rx coils. As a result, the six signals are not anymore aligned but relative offsets are present, as shown in the right-hand side part of FIG. 9C. The sensor design according to this invention mitigates significantly the common modes variations arising from coil planes misalignments. As can be clearly seen in FIGS. 9A to 9C showing the received signals for increasing misalignment between the two planes composing the coils, even for misalignment as strong as 100 μm the offset between the signals is well below the signal amplitude. The mutual inductance between Tx and Rx coils and its dependence on misalignment is shown in the left part of FIG. 9C.

Figure 10:
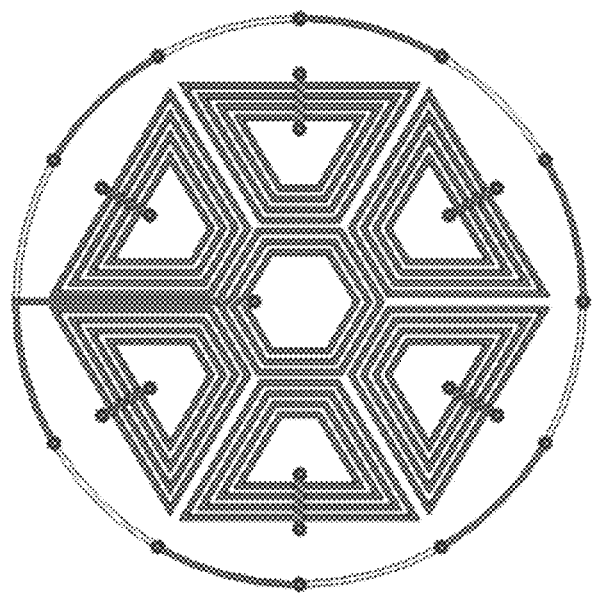
FIG. 10 illustrates an embodiment of the invention.
Figure 10:
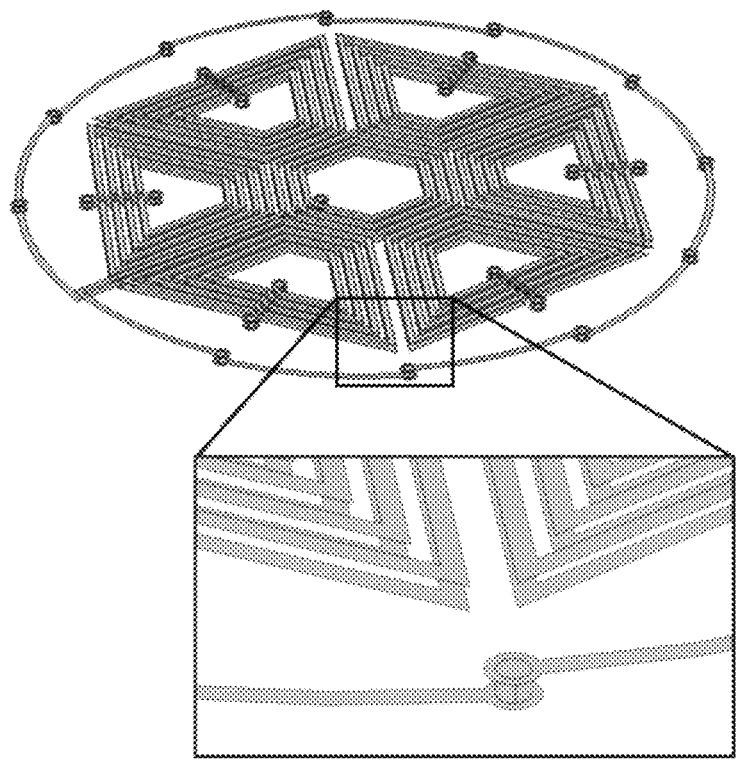

FIG. 10 shows an alternative embodiment of the inductive position sensor of the invention. Almost everything is the same as e.g. in FIG. 3, except that the Tx coil does not have two outer turns, one for each plane, but rather a single turn which alternates between the two planes. In order to maintain symmetry between the Tx coils portions and the Rx coils portions, the Tx coil outer turn makes the transition between the top and the bottom plane at the middle of each Rx coil. The inner turn of Tx coil is on the other hand identical to the previous embodiment.

Figure 11:
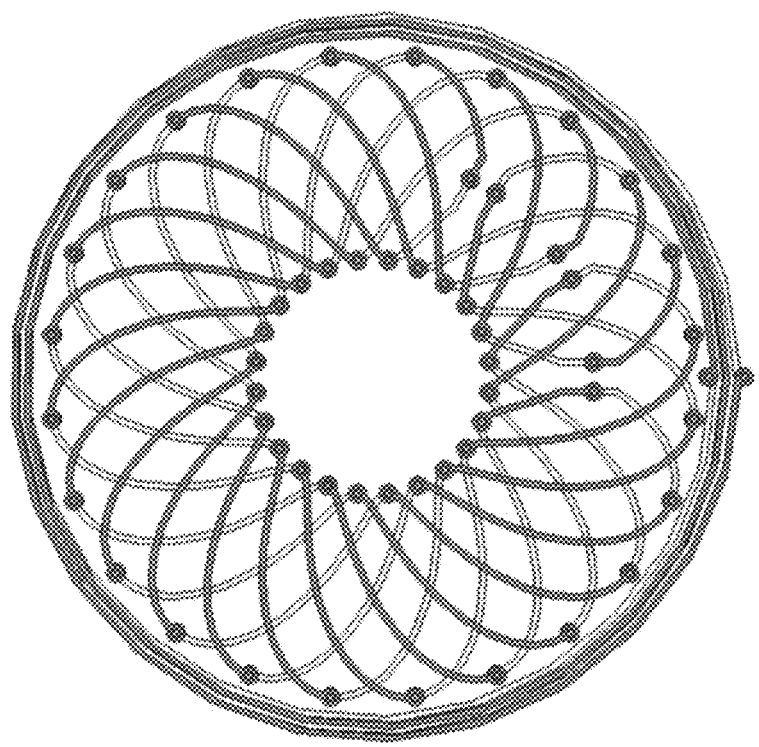
FIG. 11 illustrates an embodiment of the invention.

FIG. 11 illustrates yet another embodiment of the invention. The Tx coil is composed of four turns surrounding three Rx coils. Two turns on a top plane are superposed to two turns on a bottom plane. The three Rx coils on the other hand are alternating between the top and bottom plane.

Figure 12:
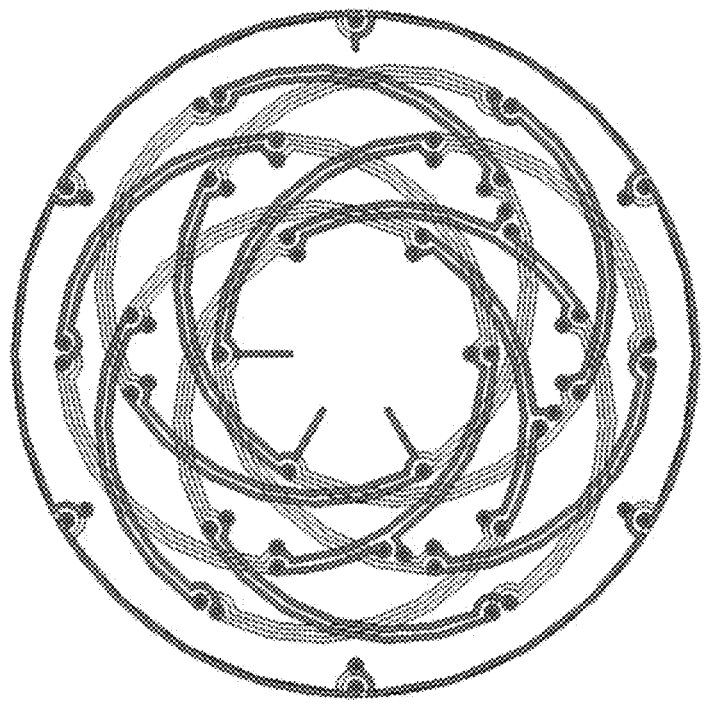
FIG. 12 illustrates an embodiment of the invention.
Figure 12:
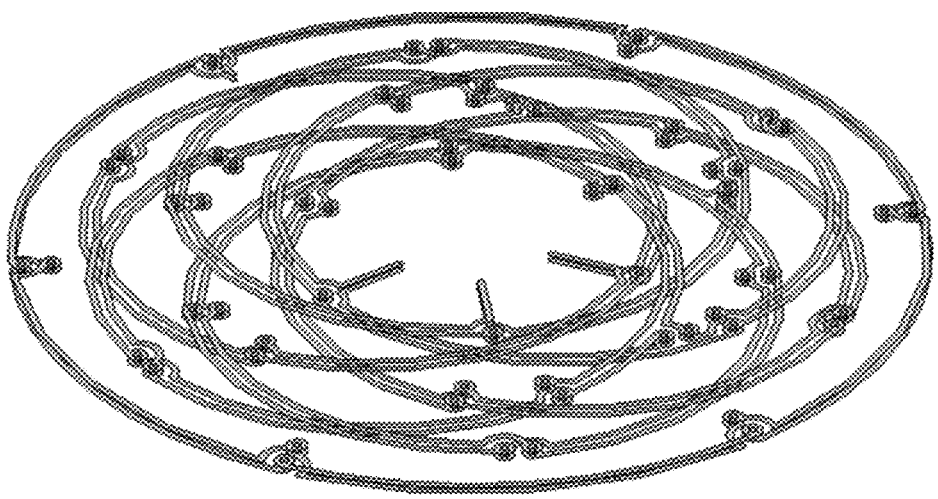

The embodiment shown in FIG. 12 is quite close to that of FIG. 11 and adopts the same principle. The Tx coil comprises two turns surrounding three Rx coils. One turn sits on a top plane and superposes to a second turn on the bottom plane. The three Rx coils are on the other hand alternating between the top and bottom plane, just as in FIG. 11.

In a further aspect the invention also discloses a system comprising an inductive position sensor as described and a target device. The target device is arranged to rotate around a centre of geometry of the inductive position sensor. A centre of geometry can be for example be a point on the intersection line of the three symmetry planes shown in FIG. 3.

The target device is configured to affect the magnetic flux coupling between the transmitting coil and the receiving coils. Thereby, the first magnetic field emanated from the transmitting coil causes eddy currents to flow within the target device. The shape or form of the target device is thereby chosen such that the eddy currents flow in a predefined direction within the target. This causes the eddy currents to produce at least one directional magnetic field, which affects the first magnetic field emanated by the transmitting coil. In detail, it deforms the course of the magnetic field lines of the emanated first magnetic field. Hence, also the magnetic flux is affected. This results in a second magnetic field, which is a superposition of the first magnetic field and the magnetic field produced by the target. It can also be said the transmitting coil inductively couples via the target to the receiving coils. In this case, the magnetic field lines extend from the transmitting coil to the respective receiving coil, wherein they pass through the target device.

The at least two receiving coils receive the affected first magnetic field and the second magnetic field, respectively, and encounter the affected magnetic flux, such that a current or voltage can be outputted by the two receiving coils. Hence, the at least two receiving coils react to the transmitting coil, in such a way that the at least two receiving coils are coupled to the at least one transmitting coil via the target device.

If the target device changes its position, the shape or form of the target device changes relatively to the magnetic field lines of the magnetic field generated by the transmitting coil, i.e. the magnetic field lines are differently affected, which in turn means the receiving coils will encounter a different magnetic flux for different positions of the target device.

For example, the shape or form of the target device may align the magnetic field lines along a particular direction, which is derivable from the shape or form of the target. If the transmitting coil and at least one of the receiving coils oppose each other along this particular direction, the magnetic flux coupling between the transmitting coil and the at least one of the receiving coils is the highest. This in turn means the respective receiving coil will measure a high induced current or voltage. The other respective receiving coil, which does not oppose the transmitting coil in the particular direction of the target device, will encounter a lower magnetic flux. This in turn means the respective receiving coils will measure a lower induced current or voltage. Since the induced currents or voltages measured by the receiving coils are proportional to the amount of magnetic flux coupling, which is affected by the shape or form of the target device, the respective currents or voltages allow a determination of the position of the target. In other words, due to the shape or form of the target device, which is non-rotational invariant, different preferred directions are encountered at different positions of the target. Hence, at different positions of the target, different magnetic flux couplings between the transmitting coil and the receiving coils are encountered. This in turn means different induced currents or voltages are encountered, from which the position of the target device can be determined. Thereby, the preferred direction in which the target aligns the magnetic field lines is dependent upon its shape or form. It can also be said that it is dependent upon structures constituting the shape or form of the target. However, since the preferred direction of the shape or form of the target is due to its invariance only predominant in one direction, an offset of the target does not significantly change the relative currents or voltages measured by the receiving coils, since their position with respect to each other is fixed and the preferred direction of the target is not changed. This means the offset of the target has the same relative effect on the magnetic flux coupling and as such on the outputted currents or voltages.

The target device may have different shapes or forms. The shape or form of the target device is non-rotational invariant in the sense that a rotation about an axis in an arbitrary angle changes the shape or form of the target device as it is seen from the location of one of the at least three sensor elements. However, it is clear to the person skilled in the art, that there may be particular angles for which a rotation about this angle may result in the same shape or form of the target.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An inductive position sensor configured to determine a position of a target device, comprising at least two coils for determining said position, whereby at least two of said at least two coils for determining said position overlap, at least one coil of said at least two overlapping cons being a transmitter coil and at least one of said at least two overlapping coils being a receiver coil and whereby said at least two coils each have a plurality of portions being substantially equally distributed over N parallel planes, N being an integer larger than or equal to two, and whereby for each of said at least two coils said portions distributed over said N parallel planes are substantially identical, so that mutual inductance between said at least two coils is substantially unaffected by misalignments between said N parallel planes.

2. The inductive position sensor as in claim 1, wherein one of said coils overlaps with the one or more other cods of said at least two coils.

3. The inductive position sensor as in claim 2, wherein any pair of said other coils does not have any overlap.

4. The inductive position sensor as in claim 1, wherein vias connecting said plurality of coil portions on said N parallel planes are substantially in a set of M symmetry planes of the configuration formed by said at least two coils, said M symmetry planes being orthogonal to said parallel planes.

5. The inductive position sensor as in claim 1, wherein N equals two.

6. The inductive position sensor as in claim 1, wherein said portions of said at least two coils are substantially identical in size and/or in shape.

7. The inductive position sensor as in claim 1, wherein said at least two coils are arranged to be connected to a feeding wire.

8. The inductive position sensor as in claim 1, comprising two parallel planes and one coil arranged to act as transmitter coil and with three portions in each plane and three coils arranged to act as receiver coil each with one portion in each plane.

9. The inductive position sensor as in claim 1, comprising six coils arranged to act as receiver coil and each comprising one portion in each plane.

10. The inductive position sensor as in claim 1, whereby each of said N parallel planes is comprised in a printed circuit board or in a redistribution layer or in a leadframe.

11. The inductive position sensor as in claim 1, whereby at least two of said at least two cons fully overlap.

12. The inductive position sensor as in claim 1, comprised in a package wherein said at least two coils are smaller than 10 mm×10 mm.

13. A system comprising the inductive position sensor as in claim 1 and said target device arranged to rotate around a centre of geometry of said inductive position sensor.

14. A method for manufacturing an inductive position sensor configured to determine a position of a target device and comprising at least two overlapping coils, at least one coil of said at least two coils being a transmitter coil and at least one of said at least two coils being a receiver coil, said at least two coils each having a plurality of portions, the method comprising distributing substantially equally over at least two parallel planes said at least two coils each having said plurality of portions, whereby for each of said at least two coils said portions distributed over said at least two parallel planes are substantially identical so that between said N parallel planes and whereby said at least two coils are inside a package comprising the inductive position sensor.

15. The inductive position sensor as in claim 1, wherein said N parallel planes are the same for said at least one transmitter coil and said at least one receiver coil.

* * * * *